United States Patent
Stephenson et al.

(10) Patent No.: US 6,367,984 B1
(45) Date of Patent: Apr. 9, 2002

(54) OPTICAL FIBER ADAPTER

(75) Inventors: Daniel L. Stephenson, Lilburn; Steven E. Sheldon, Norcross, both of GA (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/438,311

(22) Filed: Nov. 10, 1999

(51) Int. Cl.$^7$ .................................................. G02B 6/36
(52) U.S. Cl. ............................ 385/53; 385/55; 385/76; 385/77; 385/78
(58) Field of Search ............................... 385/53, 55, 56, 385/76, 77, 78, 58, 63, 60

(56) References Cited

U.S. PATENT DOCUMENTS

| | | |
|---|---|---|
| 4,738,507 A | 4/1988 | Palmquist |
| 4,738,508 A | 4/1988 | Palmquist |
| 5,067,783 A | 11/1991 | Lampert |
| 5,082,345 A | 1/1992 | Cammons et al. |
| 5,212,752 A | 5/1993 | Stepenson et al. |
| 5,274,729 A | 12/1993 | King et al. |
| 5,481,634 A | 1/1996 | Anderson et al. |
| 5,774,611 A * | 6/1998 | Nagase et al. ................ 385/58 |
| 5,774,612 A * | 6/1998 | Belenkiy et al. .............. 385/72 |
| 5,781,680 A * | 7/1998 | Womack et al. .............. 385/53 |
| 5,838,855 A * | 11/1998 | Stephenson .................. 385/53 |
| 5,940,561 A * | 8/1999 | Dean, Jr. et al. ............. 385/60 |
| 6,102,581 A * | 8/2000 | Deveau et al. ................ 385/56 |

\* cited by examiner

*Primary Examiner*—Brian Healy
*Assistant Examiner*—Sung Pak
(74) *Attorney, Agent, or Firm*—Needle & Rosenberg, P.C.; Charles H. Fails, Esq.

(57) ABSTRACT

A one-piece optical fiber adapter for coupling a first optical fiber connector to a second optical fiber connector is disclosed. The adapter is comprised of an elongate tubular one-piece body formed about a longitudinal axis, and has a first end and a spaced second end. The first end of the body is sized and shaped to receive any one of the several different types of optical fiber connectors therein, and the second end of the body is sized and shaped to also receive any one of the several differing types of optical fiber connectors therein. An elongate tubular alignment sleeve is positioned along the longitudinal axis of the body, and is received therein in a snap fit. In a first embodiment, an alignment sleeve holder is provided which is snap fit into the tubular body along the longitudinal axis thereof, the alignment sleeve being snap fit within the alignment sleeve holder. In a second embodiment, a stepped alignment sleeve used for coupling a 2.5 millimeter diameter ferrule to a 1.25 millimeter diameter ferrule is provided, which is also snap fit into and along the longitudinal axis of the tubular body. The body of the one-piece adapter is constructed and arranged to be snap fit within a mounting panel opening, a single size of mounting panel opening being used for mounting any one of the several embodiments of the one-piece adapter of this invention therein.

15 Claims, 9 Drawing Sheets

FIG. 18 PANEL SIDE

FIG. 17 CUSTOMER SIDE

OPTICAL FIBER ADAPTER

FIELD OF THE INVENTION

The invention relates in general to optical fiber adapters used to couple the connector of a first optical fiber cable to the connector of a second optical fiber cable. More particularly, the invention relates to an improved optical fiber adapter constructed as a one-piece tubular body with an alignment sleeve holder for capturing an alignment sleeve used to couple the ferrules of the two optical fiber connectors having the same diameter ferrules together, or alternatively provided with a stepped alignment sleeve for coupling optical fiber connectors having dissimilarly sized ferrules together.

BACKGROUND OF THE INVENTION

The use and construction of optical fiber cables, and of optical fiber adapters, also referred to as couplers and more recently as build-outs, used for coupling optical fiber cables together is well known. Optical fiber cables are provided with optical fiber connectors at their ends, the connectors being one of the several known types of connectors, namely being either an SC, an ST®, an FC, or an LC type of optical fiber connector. As is known, the SC, ST®, and FC connectors are each provided with a 2.5 millimeter diameter ferrule which houses the optical fiber therein along a longitudinal axis of the connector, whereas the LC type of optical fiber connector is provided with a smaller 1.25 millimeter diameter ferrule.

The earliest types of optical fiber adapters were made using a simple coupler formed as a tubular body sized and shaped to allow an alignment sleeve to be passed therethrough, and in which the ferrules of the respective optical fiber connectors were placed so that the ferrules abutted one another within the alignment sleeve for the purpose of transmitting an optical signal from one optical fiber cable to the other. An example of such an early type of optical fiber coupling is disclosed in U.S. Pat. No. 5,082,345 to Cammons, et al., assigned to AT&T Bell Laboratories, a predecessor in interest to the assignee of this invention. The coupler of Cammons, et al. was adapted to couple two of the same type of optical fiber connectors together, but first required that the ferrule of a first one of the two connectors be passed into one of the ends of the alignment sleeve and then passing both the alignment sleeve and the ferrule together into the body of the adapter, whereupon the second ferrule was passed into the alignment sleeve. The device of Cammons was not provided with a means for separately securing the alignment sleeve within the body of the adapter, rather the ferrule of the first optical fiber connector was used for this purpose. Should the alignment sleeve of the "345 patent have been placed in the adapter prior to one of the ferrules being passed therein, the first ferrule inserted into the adapter would have pushed the alignment sleeve out of the adapter, making the coupling of two optical fiber connectors quite difficult to accomplish in the field.

Another example of an early optical fiber adapter is disclosed in U.S. Pat. No. 5,212,752 to Stephenson, et al., also assigned to AT&T Bell Laboratories. The '752 patent discloses a one-piece coupler used for coupling the ends of two optical fiber cables having an SC connector at their respective ends together. As with the patent to Cammons, et al., the '752 patent was designed for use only with identically sized and shaped optical fiber connectors, in this instance SC connectors.

Accordingly, and as these two patents demonstrate, the problem that developed with these early optical fiber couplers was that as the number of differing types of optical fiber connectors increased, for example the SC, ST®, FC, and LC family of optical fiber connectors now being widely used, the situation frequently arose in the field in which a first optical fiber cable having a first type of optical fiber connector was to be connected to a second optical fiber cable having a second type of optical fiber connector.

An early solution to the problem of coupling differing types of optical fibers together was addressed in U.S. Pat. No. 5,067,783 to Lampert, also assigned to AT&T Bell Laboratories. The '783 patent to Lampert discloses an optical fiber connector build-out system having a first piece and a separate second piece which together formed the optical fiber adapter or build-out, and allowed an FC to ST® optical fiber connection, as well as ST® to ST®, and FC to FC optical fiber connections. Although Lampert represented an advance in the art, the problem still persisted that as newer types of optical fiber connectors were developed, namely the LC and SC family of optical fiber connectors, there remained a continuing need to provide a universal system of coupling different types of optical fiber connectors together.

The universal optical fiber build-out system of U.S. Pat. No. 5,274,729 to King, et al. was developed to solve the ongoing problem of coupling the myriad of differing types of optical fiber connectors together, which patent is also assigned to AT&T Bell Laboratories. The '729 patent to King, et al. allowed for the connection of SC, ST®, and FC connectors to one another, as desired. More recently, in a patent application entitled "Universal Modular Optical Fiber Build-Out", filed in the U.S. Patent Office on Apr. 1$^{st}$, 1999, U.S. patent application No. 09/282,926, and assigned to Lucent Technologies, Inc., the successor in interest to AT&T Bell Laboratories, a system was developed for coupling not only the larger 2.5 millimeter diameter ferrules of the SC, ST®, and FC connectors to one another, but also allowing, for the first time, the smaller 1.25 millimeter diameter ferrules of the LC connectors to be quickly and easily coupled to optical fiber cables terminated with any one of the 2.5 millimeter diameter ferrules of the SC, ST®, and FC connectors.

A problem that has arisen with the systems of Lampert, King, et al. and the aforementioned U.S. patent application is that in order to couple differing types of optical fiber connectors together, the optical fiber build-outs, or adapters, have been constructed of a first half for the first optical fiber connector, and of a separate second half for the second, potentially differing, type of optical fiber connector in order to allow for these couplings. This requires that two pieces be used to construct one optical fiber adapter, which construction is more costly in that it requires a larger parts inventory to accommodate "straight" and "hybrid" couplings, and may also lead to an increase in labor costs needed to assemble these optical fiber build-outs/adapters in the field. In essence, a pair of connectors is required, which connectors must themselves first be connected to one another, in order to construct the adapter used to couple the two optical fiber cables together. Moreover, the fact that the two halves of the build-out are joined together to construct the build-out presents a potential point of structural weakness within the adapter.

What is needed, therefore, is a simple one-piece optical fiber adapter of a more robust design, one which is more rigid and thus more durable, and yet which is made of the same low-cost and high durability plastic materials of the aforementioned and more recent optical fiber build-out systems, the use of which will hopefully lead to lower inventory costs, lower manufacturing costs, and also require less labor in the field by eliminating the step of first constructing the adapter prior to connecting the ends of optical fiber cables/connectors together, and which will also fit into the same footprint, i.e. panel opening, formed in the mounting panels of the junction boxes and/or switch stations at which these panels are found, and at which the optical fiber cables are terminated and/or coupled together. Moreover, there is a need for such an improved one-piece tubular optical fiber adapter which can be used for coupling any one of the known types of optical fiber connectors to any other one of the known types of optical fiber connectors, be it an LC, SC, ST®, and/or FC size and style connector, and which may be provided with an alignment sleeve, if so desired, and with a means for capturing the alignment sleeve within the adapter so that the alignment sleeve need not be handled in the field in what may be less than desirable job and/or field conditions when coupling optical fiber connectors together.

SUMMARY OF THE INVENTION

The present invention provides an improved one-piece optical fiber adapter which overcomes some of the design deficiencies of the known art. The one-piece optical fiber adapter of this invention provides a simple, efficient, and highly flexible device for coupling optical fiber cables together in the field quickly and easily.

Moreover, the relative simplicity of the optical fiber adapter of this invention, when contrasted to the known optical fiber adapters and/or build-outs, provides a greater degree of simplicity, reliability, durability, maintainability, and ease of use in the field when connecting similarly sized and shaped optical fiber connectors, as well as dissimilarly sized and shaped optical fiber connectors, together.

This invention attains this degree of flexibility, as well as simplicity in design and ease of use, by providing an elongate adapter comprised of a one-piece tubular body formed about a longitudinal axis, the body having a first end and a spaced second end. The first end of the adapter body is sized and shaped to receive a first optical fiber connector therein, and the second end of the body is sized and shaped to receive a second optical fiber connector therein. An elongate tubular alignment sleeve is positioned along the longitudinal axis of the body, and is held therein in a first snap fit for being secured within the body of the adapter so that when it is used for connecting optical fiber connectors together, they can be quickly and easily fastened to the respective ends of the adapter and their respective ferrules passed into the alignment sleeve without the need for handling the alignment sleeve in the field, i.e. by having to first pass the alignment sleeve over the ferrule of one of the connectors before passing the connector and the alignment sleeve together into the tubular body for connection to the ferule of the second optical fiber connector.

The invention thus comprises, in one embodiment, an elongate alignment sleeve holder positioned along the longitudinal axis of the adapter body and received within the adapter body in a second snap fit, the alignment sleeve being received within the alignment sleeve holder in the aforementioned snap fit along the longitudinal axis of the adapter. In this construction, the alignment sleeve holder is releasably held or captured within the tubular body of the adapter, with the alignment sleeve being separately and releasably captured within the alignment sleeve holder. In this embodiment of the invention, an alignment sleeve holder latching device is provided for retaining the alignment sleeve holder within the body in the second snap fit, the latching device comprising at least one elongate latch gate spaced from and extending in a lengthwise direction parallel to the axis of the adapter body, and at least one annular stop formed within the body and about the axis thereof, the stop being spaced from the at least one latch gate for defining an alignment sleeve holder capture gap therebetween.

The at least one latch gate is constructed and arranged to yield to the alignment sleeve holder as it is passed thereover and along the axis of the adapter body while being positioned therewithin, and to resiliently expand thereafter for retaining the alignment sleeve holder within the tubular body against the at least one annular stop in the described snap fit.

In a second embodiment, the alignment sleeve may comprise a stepped alignment sleeve for connecting a 2.5 millimeter diameter ferrule connector, for example an SC, ST®, FC connector, to a smaller 1.25 millimeter diameter ferrule connector, namely an LC optical fiber connector. The stepped alignment sleeve takes the place of both of the aforementioned alignment sleeve holder and alignment sleeve as it performs both of the functions of the alignment sleeve and the sleeve holder both in this embodiment of the invention. The stepped alignment sleeve is also captured within the body of the adapter in a snap-fit for securing the stepped alignment sleeve within the tubular body of the adapter.

So constructed, the one-piece tubular optical fiber adapter of this invention allows for a first optical fiber connector selected from one of the group of optical fiber connectors consisting of an SC, ST®, FC, and/or LC optical fiber connector to be connected to the first end of the tubular body, and also allows for a second optical fiber connector to be connected to the second end of the tubular body, where the second optical fiber connector is also selected from one of the group of optical fiber connectors consisting of an SC, ST®, FC, and/or LC optical fiber connector.

The adapter of this invention is constructed and arranged to be received within a third snap fit within a mounting panel. Accordingly, the adapter is provided with at least one annular mounting flange formed on and extending at least partially about the exterior surface of the body and intermediate the ends thereof, with at least one resilient locking flange on the exterior surface of the body spaced from the mounting flange for defining a mounting panel capture gap therebetween. The locking flange is constructed and arranged to be urged inwardly toward the tubular body of the adapter as the adapter is passed through a mounting panel opening defined within the mounting panel, and to thereafter resiliently expand into a locking position for receiving the adapter therein in a snap fit.

It is, therefore, an object of the present invention to provide an improved one-piece optical fiber adapter for use with the known types of optical fiber connectors.

It is another object of the present invention to provide an improved one-piece optical fiber adapter which is simple in design and construction, is rugged and durable in use, and which is easy to use, install, and maintain in field applications.

It is to these objects, as well as to the other objects, features, and advantages of the present invention, which will become apparent upon reading the specification, when taken in conjunction with the accompanying drawings, to which this invention is directed.

DETAILED DESCRIPTION OF THE PREFERRED EMBODIMENTS

Figure 1:
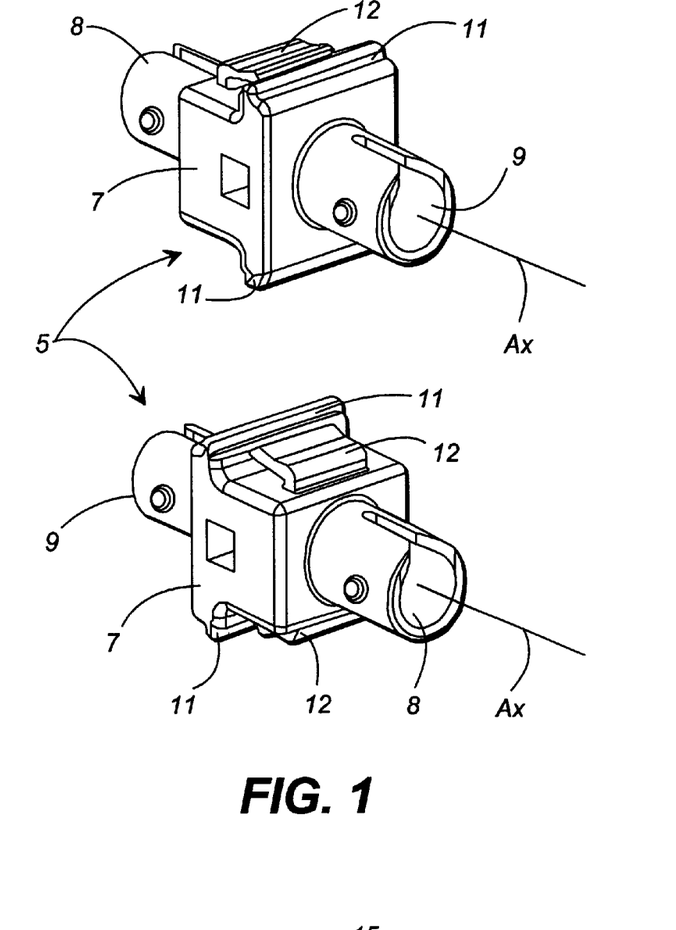
FIG. 1 illustrates a front and a rear perspective view of a one-piece ST®—ST® optical fiber adapter.
Figure 7:
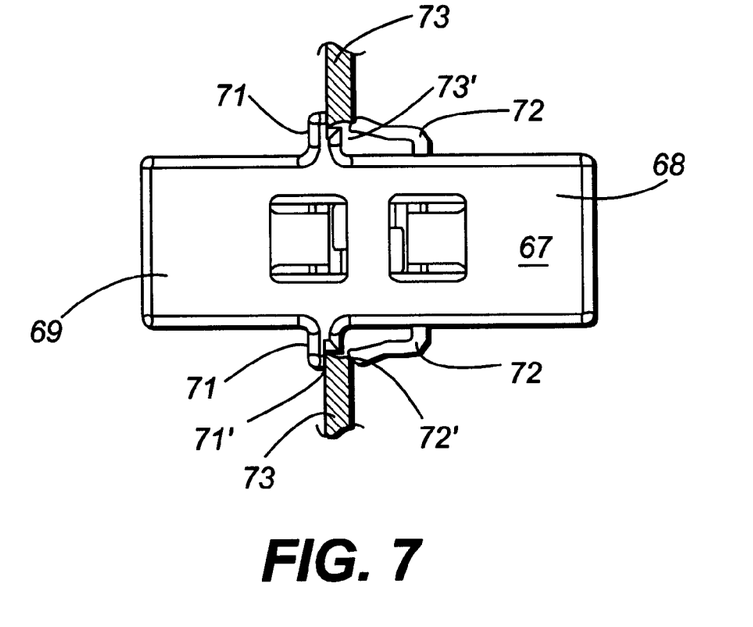
FIG. 7 is a side elevational view of the optical fiber adapter of FIG. 5, illustrating the manner in which the optical fiber adapter is fit within a mounting panel in a snap fit.

Referring now in detail to the drawings, in which like reference characters indicate like parts throughout the several views, a one-piece optical fiber adapter 5 for use in coupling an ST® optical fiber connector (not illustrated) to a second ST® optical fiber connector (not illustrated) is shown in front and rear perspective view in FIG. 1. The optical fiber adapter 5 is comprised of an elongate tubular body 7 formed about a longitudinal axis, denoted by the reference character "$A_x$", having a first end 8 and a spaced second end 9, each of the ends being constructed for receiving an ST® type of optical fiber connector therein. Formed on the exterior surface of the body, intermediate the ends thereof, are a first pair of mounting flanges 11, and a spaced pair of resilient locking flanges 12, the locking flanges 12 being spaced from a respective one of the mounting flanges for defining separate mounting panel gaps therebetween so that the adapter 5 may be snap fit within a mounting panel 73, and more particularly in the opening 73' thereof, as illustrated in FIG. 7 for all embodiments of the one-piece adapter of this invention.

Figure 2:
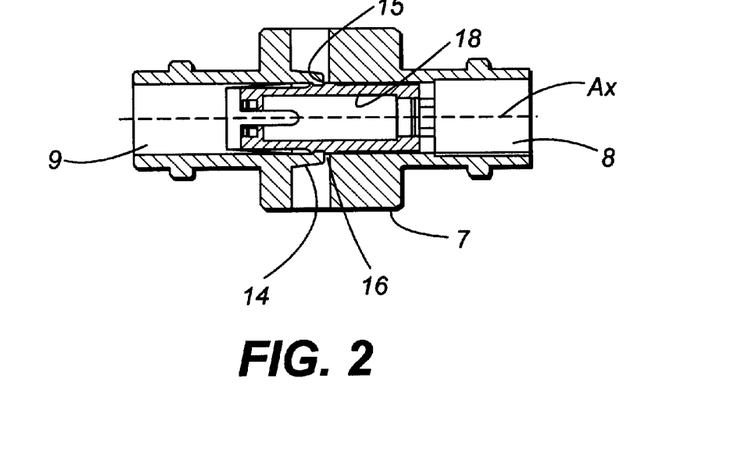
FIG. 2 is a cross-sectional view of the adapter of FIG. 1.

Referring now to FIG. 2, the optical fiber adapter 7 of FIG. 1 is shown in cross-section along its length, in which the one-piece body 7 is shown with its spaced ends 8 and 9, and having at least one, and in this instance a pair of radially spaced latch gates 14 formed of a resilient material, preferably plastic, each of the latch gates being longitudinally spaced from an annular stop 15 defined within the tubular body for defining an alignment sleeve holder capture gap 16 therebetween. As the alignment sleeve holder 18 is passed along the longitudinal axis of the optical fiber adapter, the resilient latch gate or gates will be urged outwardly and away from the longitudinal axis of the adapter, and will resiliently snap back into their original positions after the alignment sleeve holder has been passed thereover and captured within the capture gap 16.

Although not illustrated in FIG. 2, it is anticipated that an elongate tubular alignment sleeve (not illustrated) of the type known to those of skill in the art will be snap fit in the alignment sleeve holder first, prior to the alignment sleeve holder being snap fit within the tubular body of the adapter so that service technicians and other optical fiber installation technicians need not handle these relatively small alignment sleeves as they couple optical fiber connectors to one another in the field. Also, it is intended that the alignment sleeve holder 18 may be removed from its snap fit within the adapter body by spreading or otherwise forcing open the resilient flanged latch gates 14 to allow the alignment sleeve holder to be pushed or pulled out of the adapter body, when and as desired. An example of when it may be desirable to remove the alignment sleeve holder and/or the alignment sleeve would be on those occasions when it is desirable to either place an attenuator element (not illustrated) between the ends of the ferrules being connected, or to change out the attenuator element for either increasing or decreasing the loss in signal strength between the ends of the two ferrules coupled together in the adapter, when and as desired.

Figure 16:
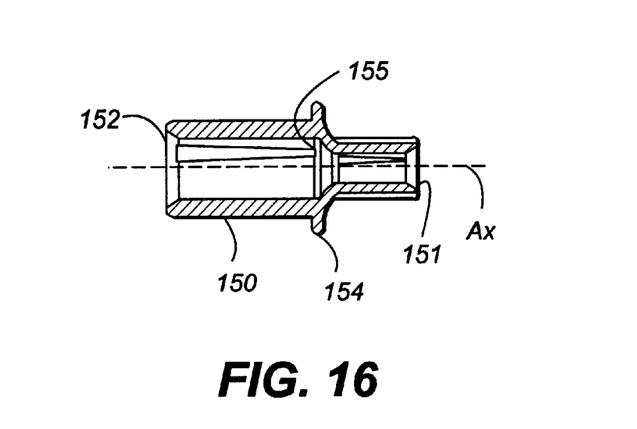
FIG. 16 is a cross-sectional view along the length of the stepped alignment sleeve of FIG. 15.
Figure 17:
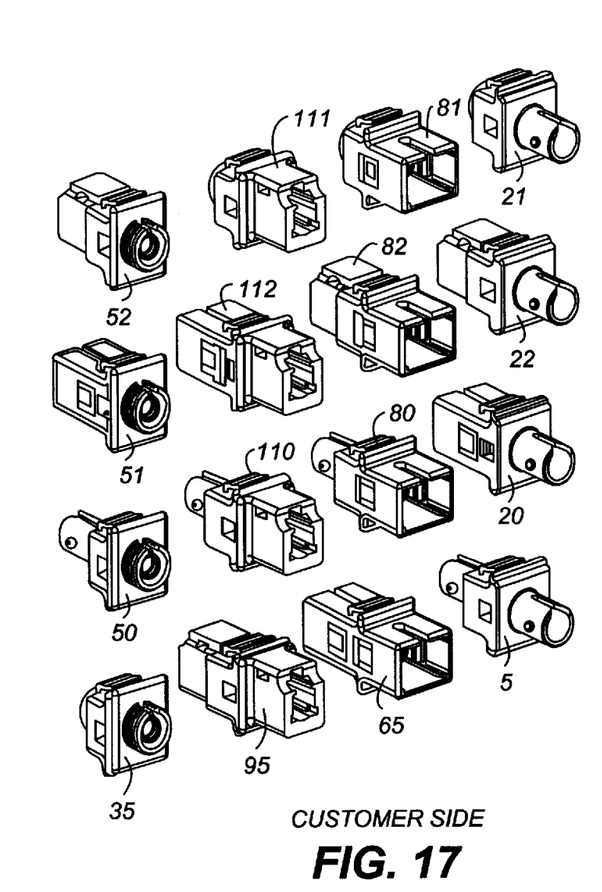
FIG. 17 is a front perspective illustration of the family of one-piece optical fiber adapters practiced by this invention.

When it is desired to couple an ST® optical fiber connector at one end of the tubular body 7 of FIGS. 1 and 2 to either an SC or FC type of optical fiber connector having a similarly sized and shaped ferrule, i.e. a 2.5 millimeter diameter ferrule, at the other end of the adapter, then the one-piece body will be constructed differently to allow for different types of optical fiber connections to be received at its respective ends, as shown in FIGS. 16 and 17, so that a "family" of one-piece optical fiber adapters is provided by this invention. Toward this end, FIGS. 17 and 18 illustrate a one-piece ST® to SC tubular optical fiber adapter 20, a one-piece ST® to FC optical fiber adapter 21, and a one-piece ST® to LC optical fiber adapter 22, the construction of which, namely the use of a stepped alignment sleeve, is described in greater detail below.

Figure 18:
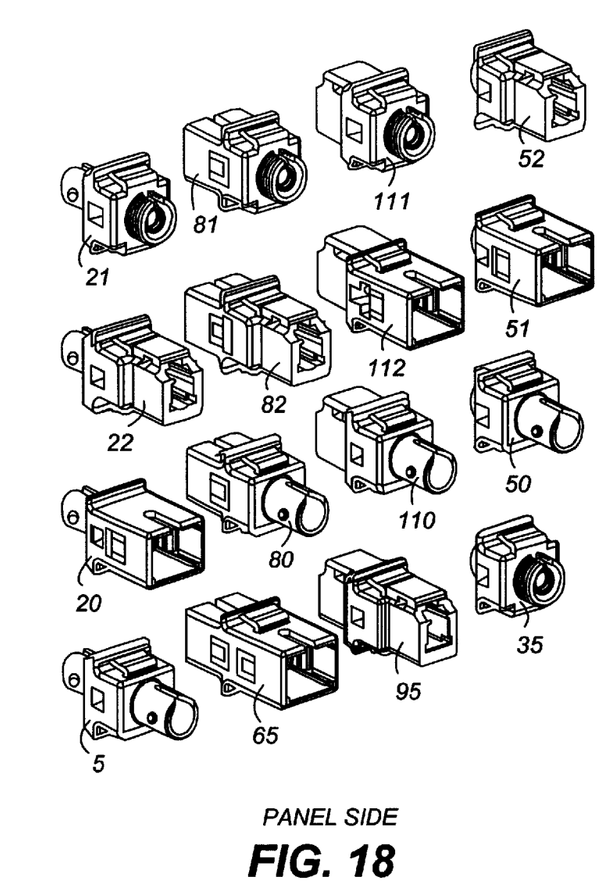
FIG. 18 is a rear perspective view of the family of one-piece adapters illustrated in FIG. 17.

This invention thus provides for a great degree of flexibility in that separate one-piece optical fiber adapters are created for each one of the "straight" ST® to ST®, SC to SC, and FC to FC optical fiber connections, as well as the ST® to FC, ST® to SC, and FC to SC optical fiber connections, and also the "hybrid" ST®/SC/FC to LC optical fiber connections, in any desired combination, as shown in FIGS. 17 and 18. It is a feature of this invention that a separate one-piece tubular adapter adapted for fastening the two specific and desired types of optical fiber connectors together will be provided for each possible type of coupling that may occur in the field.

Figure 3:
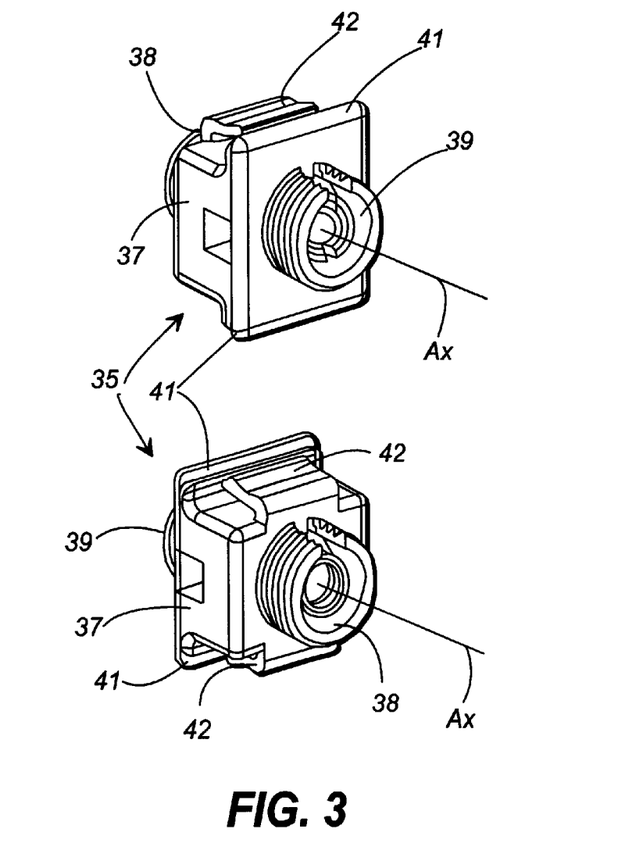
FIG. 3 illustrates a front and a rear perspective view of a one-piece FC—FC optical fiber adapter.
Figure 4:
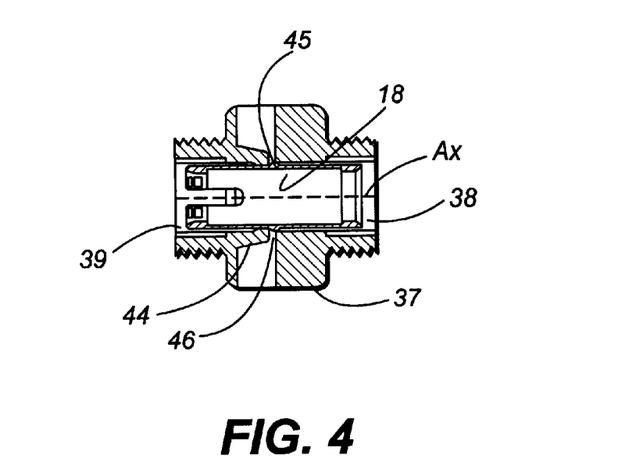
FIG. 4 is a cross-sectional view of the adapter of FIG. 3.

Referring now to FIGS. 3 and 4, a one-piece tubular FC to FC optical fiber adapter 35 is illustrated, once again having a tubular elongate body 37 formed about a longitudinal axis $A_x$, having a first end 38 and a spaced second end 39, each of the ends thereof being constructed for receiving an FC type of optical fiber connector therein. The tubular body 37 of the FC—FC optical fiber adapter is provided with a pair of spaced and opposed mounting flanges 41 formed intermediate the ends of the body, as well as a pair of spaced and opposed locking flanges 42 spaced from the respective mounting flanges for forming a mounting panel capture gap therebetween for allowing the one-piece adapter to be snap fit into a mounting panel.

Although it may not be plainly visible from the drawings of this invention, it is anticipated that each one of the one-piece optical fiber adapters of this invention will have a portion of their respective tubular bodies, intermediate the respective ends thereof, similarly if not identically sized and shaped and provided with the described mounting and locking flanges so that any one of the several embodiments of the one-piece optical fiber adapter of this invention may be received with identically sized and shaped panel openings defined within a mounting panel. This also has the effect of greatly simplifying the use of these adapters over the other types of adapters, for example those shown in the patent to King, et al., U.S. Pat. No. 5,274,729, which required differently sized and shaped openings in the mounting panel for the differing types of optical fiber build-outs disclosed by that invention.

Referring now to FIG. 4, and fashioned similar to the one-piece adapter of FIG. 2, the tubular body 37 of the FC—FC optical fiber adapter is provided with a radially spaced pair of latch gates 44 and a pair of spaced annular stops 45 which together define an alignment sleeve holder capture gap 46 therebetween. The latch gates 44 are constructed in fashion identical to the latch gates 14 for the adapter of FIG. 2, and are thus resilient for allowing the alignment sleeve holder to be passed along the axis of the tubular body, and to snap back into position for locking the alignment sleeve holder 18 in position within the body 37 of the adapter. As the ST® and FC optical fiber connectors for use with the one-piece adapters 5 and 35 each use a 2.5 millimeter diameter ferrule, the same alignment sleeve holder 18 is used with both of these two embodiments of the adapter, as well as for the one-piece SC adapter.

As with the one-piece ST® optical fiber adapter 5 of FIGS. 1 and 2, and referring now to FIGS. 17 and 18, based on the above-described "family" approach to the one-piece optical fiber adapters of this invention, a one-piece FC-ST® optical fiber adapter 50 is illustrated, as are one-piece optical fiber adapters for an FC to SC connection 51, and an FC to LC connection 52.

Figure 5:
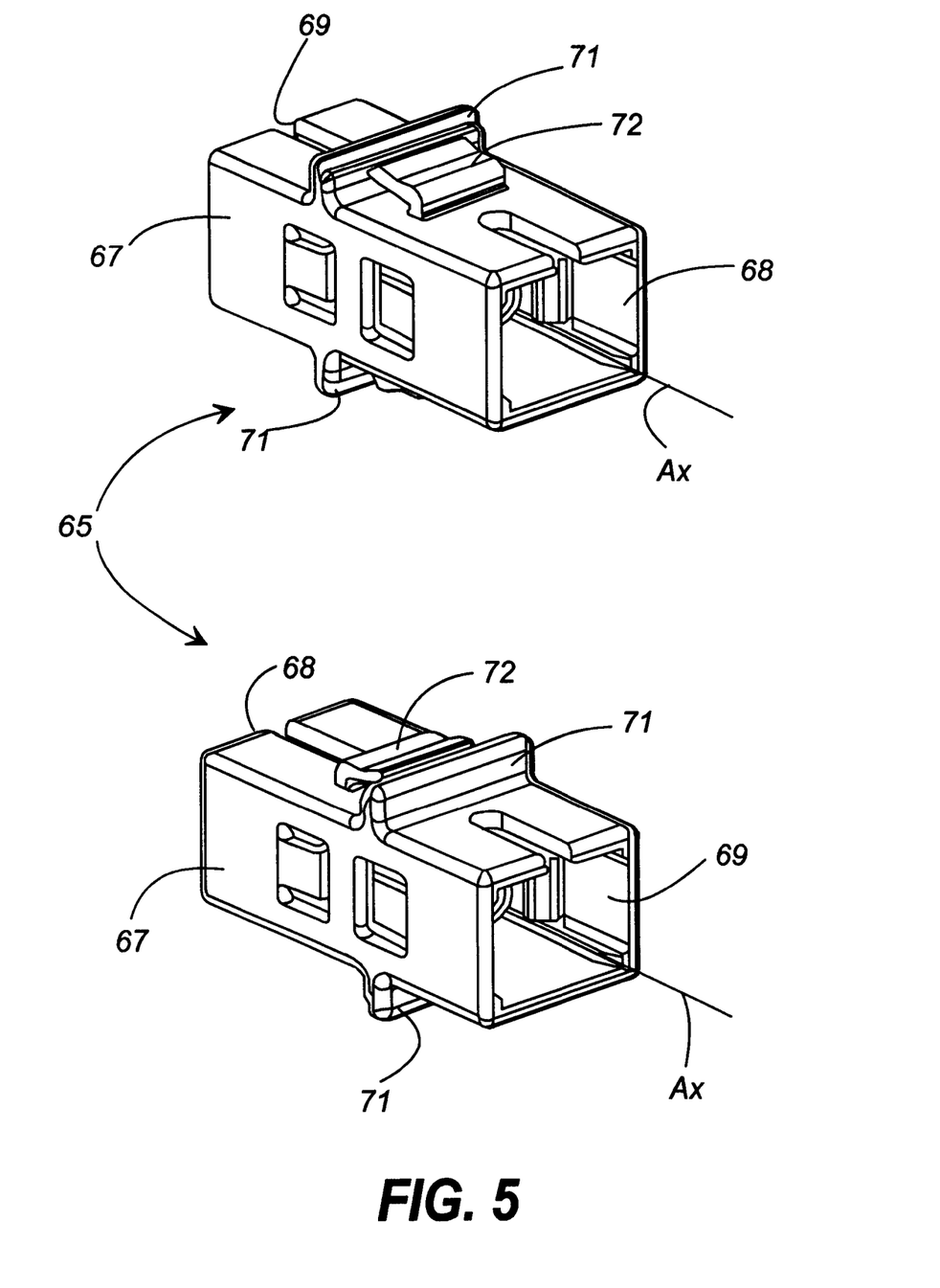
FIG. 5 illustrates a front and a rear perspective view of a one-piece SC—SC optical fiber adapter.
Figure 6:
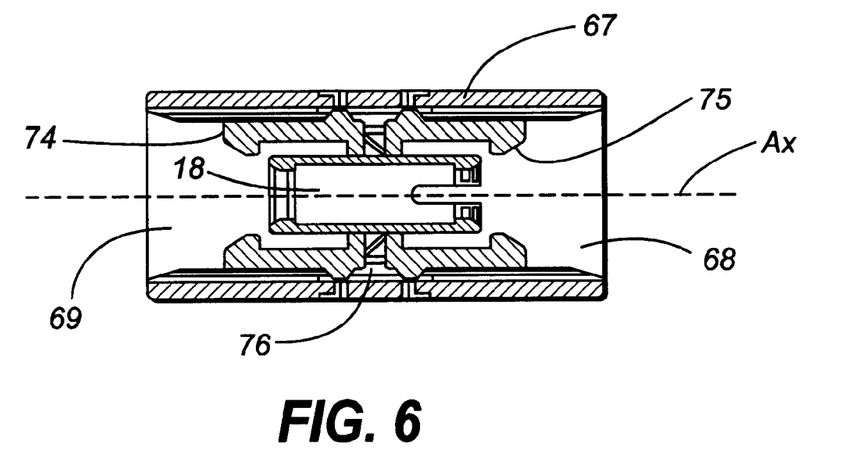
FIG. 6 is a cross-sectional view of the adapter of FIG. 5.

A one-piece SC—SC optical fiber adapter 65 is illustrated in FIGS. 5 through 7. Once again, the optical fiber adapter has a tubular one-piece body 67 formed about a longitudinal axis $A_x$, having a first end 68 and a spaced second end 69. Formed intermediate the ends of the body are a pair of spaced and opposed mounting flanges 71, and a pair of spaced and opposed locking flanges 72.

Referring now to FIG. 7, the SC optical fiber adapter 65 is used as an illustrative embodiment of the manner in which each one of the several embodiments of the one-piece optical fiber adapter of this invention are received within a mounting panel in a similarly sized and shaped opening. Accordingly, a mounting panel 73 is shown, in which a mounting panel opening 73' is defined. An elongate notch 71' is formed along the length, i.e. across the width, as it were, of the tubular body 67 of the adapter, on both of the mounting flanges, and a similarly sized and shaped notch 72' is formed along the length, again across the width of the adapter body, of the resilient locking flanges 72, so that these respective notched portions will receive the edges of the mounting panel opening 73' therein after the tubular adapter has been passed through the opening when mounting the adapter to the panel.

The adapter is mounted within the mounting panel by passing the first end of the one-piece adapter through the mounting panel opening 73'. As this occurs, the two opposed resilient locking flanges 72 are urged inwardly toward the longitudinal axis of the adapter body. Once they have passed through the mounting panel opening, they then spring or expand outwardly for engaging the edges of the mounting panel opening 73' for locking the adapter body within the mounting panel. However, as the locking flanges are resilient, they may be pressed inwardly with the fingers and the tubular body urged outwardly of the mounting panel, by pushing the first end 68 so that the body of the tubular adapter is freed from the mounting panel opening, thus allowing the quick and easy replacement of one embodiment of the one-piece adapter for another embodiment of the one-piece adapter, when and as desired, or for allowing the adapters of other build-outs systems to be received therein if they are similarly sized and shaped for being captured within the same mounting panel opening 73'.

FIG. 6 illustrates, once again, the manner in which the alignment sleeve holder 18 of the optical fiber adapter 65 is captured within and along the longitudinal axis of the body. In this instance, rather than using latch gates as shown in FIGS. 2 and 4, since the body 67 is used for coupling two SC type of optical fiber connectors together, a pair of latch beams 74 and 75 are received within the tubular body 67 in a snap fit, in known fashion. The two latch beams together define the capture gap 76 therebetween so that the alignment sleeve holder 18 is captured therebetween. In order to construct the one-piece adapter of FIGS. 5 and 6, however, it is necessary to first place one of the latch beams 74 or 75 within the body of the adapter, then place the alignment sleeve holder within the opening (not illustrated) defined within the latch beam, and then pass the second latch beam into the other open end of the adapter body, and over the unfastened end of the alignment sleeve holder, whereupon the second latch beam is snapped into place for securing the alignment sleeve holder in position along the longitudinal axis of the adapter body. However, the same alignment sleeve holder 18 is used here as is used with the ST®—ST® and the FC—FC embodiments of this invention.

FIGS. 17 and 18 illustrate once again the "family" approach to the one-piece adapters of this invention, illustrating a one-piece SC to ST® optical fiber adapter 80, a once-piece SC to FC optical fiber adapter 81, and a one-piece SC to LC optical fiber adapter 82.

Figure 8:
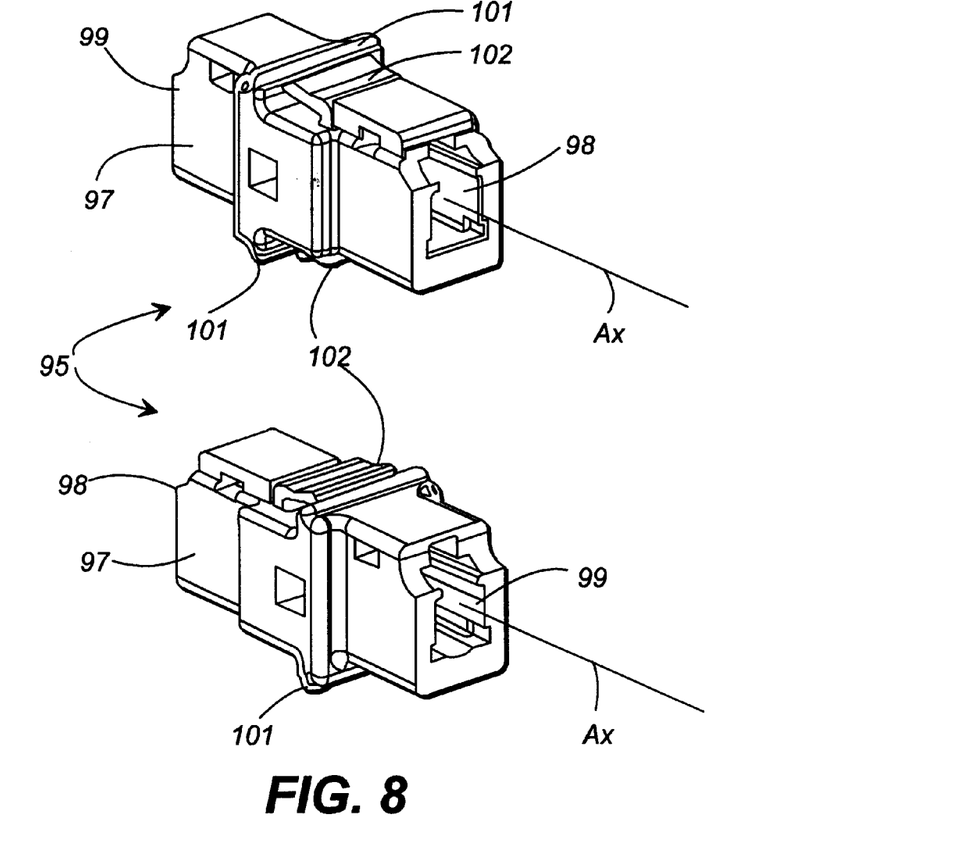
FIG. 8 illustrates a front and a rear perspective view of a one-piece LC—LC optical fiber adapter.

FIG. 8 illustrates a one-piece LC to LC optical fiber adapter. Once again, the optical fiber adapter has an elongate tubular body 97 formed about a longitudinal axis $A_x$, having a first end 98 and a spaced second end 99. Here, both the first and second ends 98, 99 are fashioned for receiving an LC type of optical fiber connector therein. As best shown ion FIG. 8, a pair of spaced and opposed mounting flanges 101 are formed intermediate the ends of the body 97, with a pair of spaced and opposed resilient locking flanges 102 also being formed on the exterior surface of the body, for defining the mounting panel capture gap therebetween.

Figure 9:
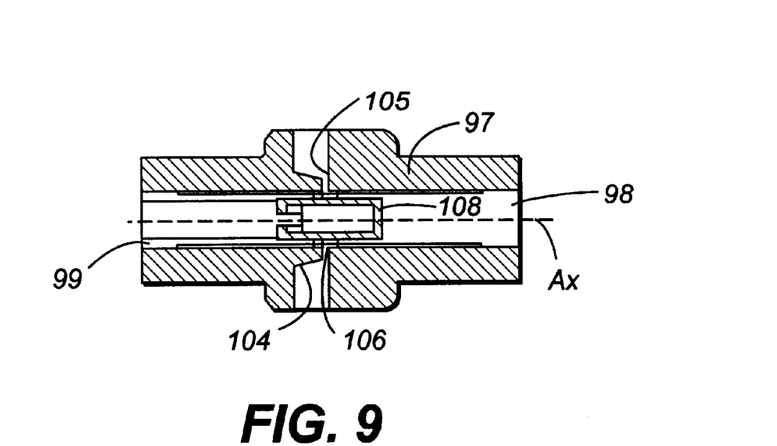
FIG. 9 is a cross-sectional view along the length of the adapter of FIG. 8.

Referring now to FIG. 9, the alignment sleeve latching mechanism used in the one-piece LC—LC optical fiber adapter 95 is the same as that used in the ST® and FC adapters, namely at least pair of resilient latch gates 104 spaced radially about the longitudinal axis of the adapter are provided, spaced from a respective one of at least a pair of annular stops 105 for defining a capture gap 106 therebetween, and for receiving an alignment sleeve holder 108 therebetween. The alignment sleeve holder 108 here is sized and shaped for coupling the ends of two 1.25 millimeter diameter ferrules together, rather than the larger 2.5 millimeter diameter ferrules of the alignment sleeve holder 18. The construction of alignment sleeve holder 108 will be described in greater detail below.

Figure 10A:
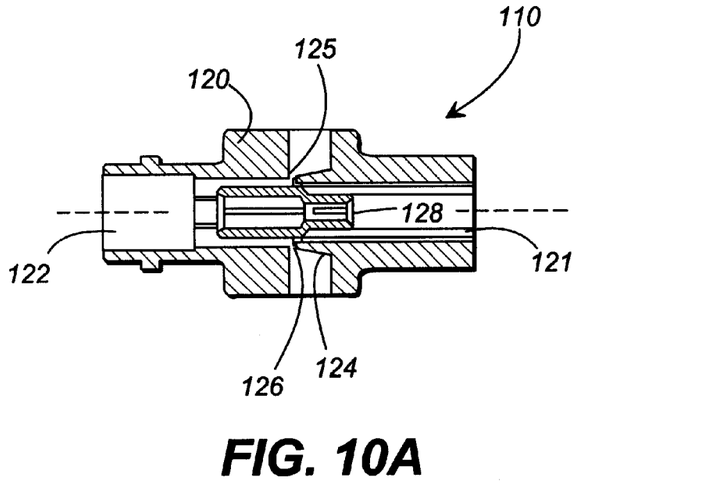
FIG. 10A is a cross-sectional view along the length of a hybrid LC—ST® one-piece optical fiber adapter.
Figure 10B:
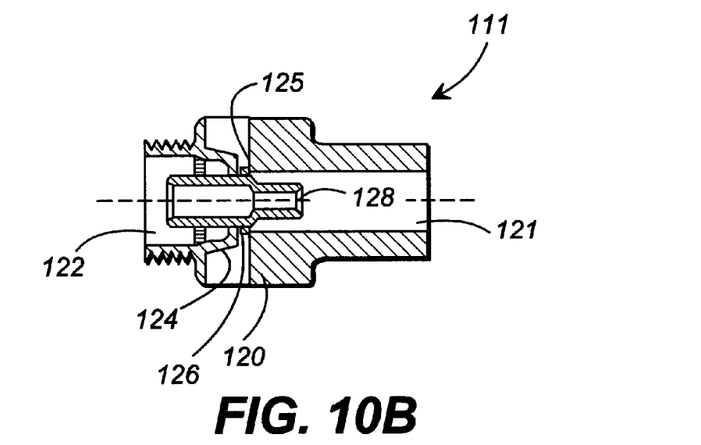
FIG. 10B is a cross-sectional view along the length of a hybrid LC—FC one-piece optical fiber adapter.
Figure 10C:
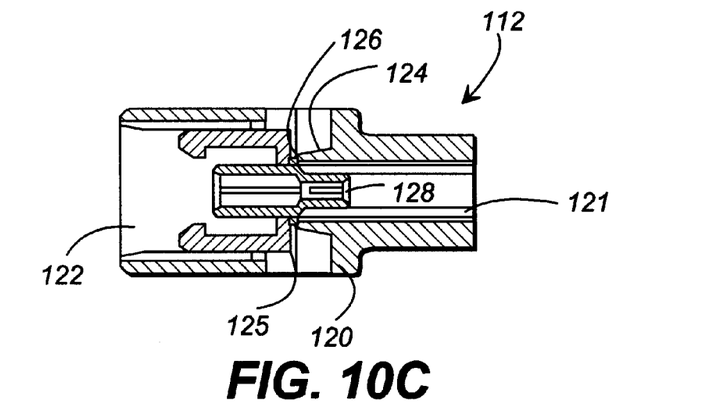
FIG. 10C is a cross-sectional view along the length of a hybrid LC—SC one-piece optical fiber adapter.

FIGS. 10A through 10C illustrate the three "hybrid" combinations which result when coupling an LC optical fiber connector to an ST® optical fiber connector with the one-piece adapter 110 of FIG. 10A; an LC optical fiber connector to an FC optical fiber connector utilizing the one-piece optical fiber adapter 111 of FIG. 10B; and coupling an LC optical fiber connector to an SC optical fiber connector utilizing the one-piece optical fiber adapter 112 of FIG. 10C. For ease of convenience, the structural members of each of these three embodiments carry similar reference numbers, each one of these three one-piece adapters having an elongate tubular body 120 formed about a longitudinal axis $A_x$, having a first end 121 and a spaced second end 122. As shown in FIGS. 10A through 10C, and unlike the adapters shown in FIGS. 1 through 9, these "hybrid" one-piece adapters are constructed to receive dissimilarly sized and shaped optical fiber connectors at each end of the one-piece tubular body for allowing these hybrid couplings. However, in fashion similar to the embodiments of the invention illustrated in FIGS. 1 through 9, the body is provided with at least one latch gate 124 or a latch beam 124 (FIG. 10C), spaced from at least one annular stop 125 for defining an alignment sleeve holder gap 126 therebetween, although rather than using an alignment sleeve holder in these embodiments of the invention, a stepped alignment sleeve 128 is used, as described in pending U.S. patent application No. 09/201,117 to Shahid, et al., entitled "Alignment Sleeves for Interconnecting Optical Ferrules of A Dissimilar Size, and Methods for Making Same," filed in the United States Patent and Trademark Office on Dec. 14, 1998, and assigned to Lucent Technologies, Inc., the provisions of which are incorporated herein fully by this reference. The construction of stepped alignment sleeve 128 is described in greater detail below.

Figure 11:
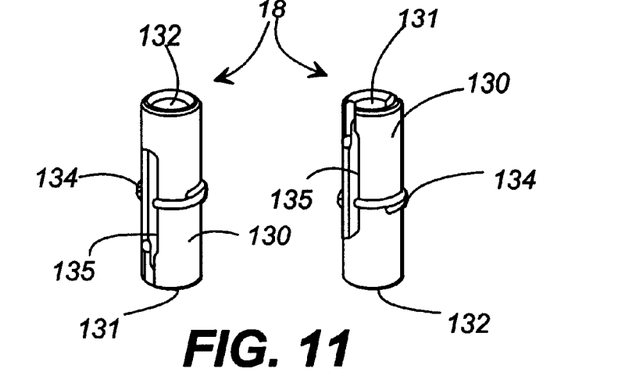
FIG. 11 illustrates a first and a second perspective view of a 2.5 millimeter alignment sleeve holder used with the adapter of this invention.
Figure 12:
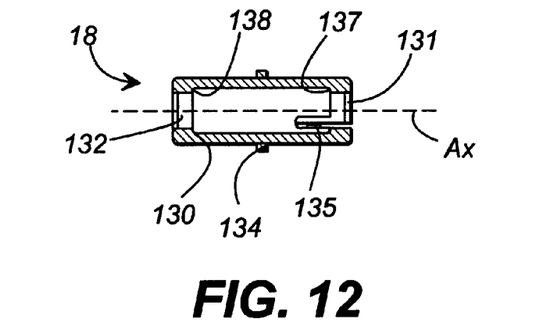
FIG. 12 is a cross-sectional view along the length of the alignment sleeve holder of FIG. 11.

FIGS. 11 and 12 illustrated the alignment sleeve holder 18 used for coupling the 2.5 millimeter diameter ferrules of the SC, ST®, FC optical fiber connectors. The alignment sleeve holder is comprised of an elongate tubular body 130 formed about a longitudinal axis $A_x$, having a first end 131 and a spaced second end 132. Formed about the exterior surface of the body, and intermediate the ends thereof, is an annular flange 134, the annular flange being sized and shaped to deflect the respective latch gates of the several varying embodiments of the one-piece adapter of this invention outwardly and away from the longitudinal axis of the adapter body, and then to be passed into and received or "captured" in the capture gap defined between the respective latch gates and stops of the several embodiments of this invention.

Referring now to FIGS. 11 and 12, an elongate slot 135 is defined within the body of the alignment sleeve holder, and extends from one of the ends thereof and at least partially along the longitudinal axis $A_x$ for allowing an attenuator element (not illustrated) to be passed therethrough and into and along a conventional alignment sleeve (not illustrated). The alignment sleeve is captured within the alignment sleeve holder between a pair of spaced and opposed internal shoulders 137 and 138 formed as a part of the alignment sleeve holder. Also, the above-described slot 135 allows the first end 131 of the alignment sleeve holder to be spread open for allowing the alignment sleeve to be passed therethrough and then captured within the alignment sleeve holder in a snap fit between and against the internal shoulders.

Figure 13:
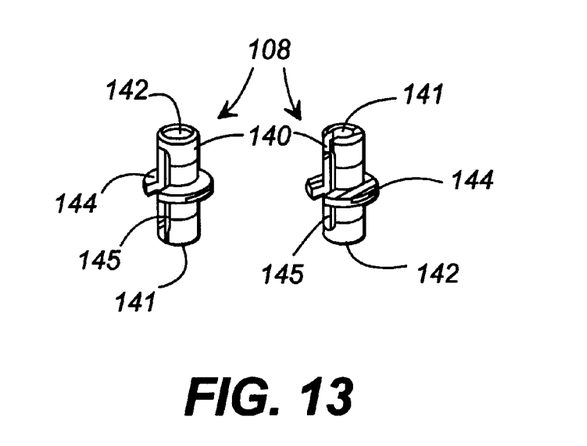
FIG. 13 illustrates a first and a second perspective view of a 1.25 millimeter alignment sleeve holder used with the adapter of this invention.
Figure 14:
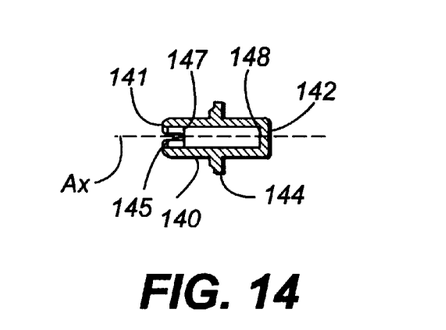
FIG. 14 illustrates a cross-sectional view along the length of the alignment sleeve holder of FIG. 13.

A second embodiment of the alignment sleeve holder 108 of this invention is illustrated in FIGS. 13 and 14. This embodiment of the alignment sleeve holder is used for coupling the smaller 1.25 millimeter diameter ferrules of LC optical fiber connectors together, and is used within the one-piece LC optical fiber adapter 95 shown in FIGS. 8 and 9. The alignment sleeve holder 108 is constructed in fashion similar to the alignment sleeve holder 18 by being provided with an elongate tubular body 140 formed about a longitudinal axis $A_x$, having a first end 141 and a spaced second end 142. An annular flange 144 extends about the exterior surface of the body 140, the annular flange 144 having the same outside diameter as does the flange 134 of the larger alignment sleeve holder 18, so that if it ever became possible that the SC, ST®, and FC connectors used smaller 1.25 millimeter diameter ferrules, for example, then the alignment sleeve holder 108 could be placed within these adapter bodies in lieu of the larger alignment sleeve holder 18.

Still referring to FIGS. 13 and 14, an elongate slot 145 is formed within the body 140 of the alignment sleeve holder, which slot extends from the first end of the body and at least partially along the longitudinal axis thereof for allowing an attenuator element (not illustrated) to be passed therethrough and into a conventional alignment sleeve (not illustrated). The alignment sleeve is held within the body of the alignment sleeve holder between a pair of spaced and opposed internal shoulders 147 and 148, in a snap fit. Also, the slot 145 allows for the first end of the alignment sleeve holder to be spread open to allow the alignment sleeve to be passed therein and captured between the internal shoulders in a snap fit.

Figure 15:
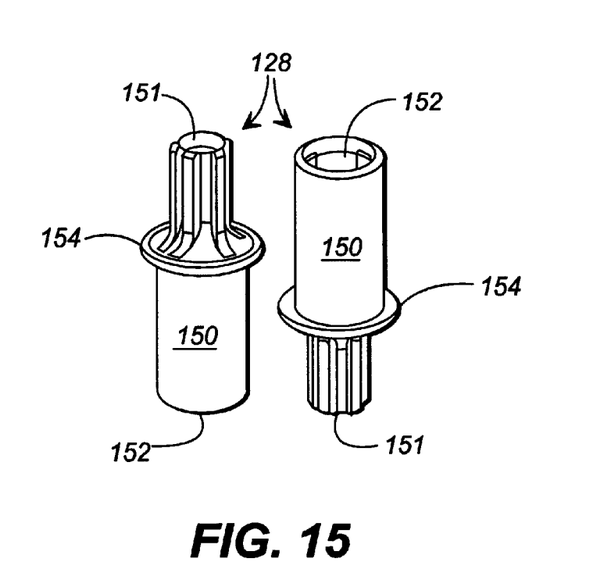
FIG. 15 illustrates a first and a second perspective view of a stepped alignment sleeve used with the adapter of this invention.

The stepped alignment sleeve 128 used with the "hybrid" one-piece optical fiber adapters of this invention is illustrated in FIGS. 15 and 16. The stepped alignment sleeve is comprised of an elongate tubular body 150 formed about a longitudinal axis $A_x$, having a first end 151 and a spaced second end 152. Here however, the first end 151 is sized and shaped for receiving a 1.25 millimeter diameter ferrule therein, whereas the second end is sized and shaped for receiving a larger 2.5 millimeter diameter ferrule therein, the two ends of the stepped alignment sleeve 128, however, aligning the ferrules of the two optical fiber connectors (not illustrated) with one another along the longitudinal axis $A_x$ thereof to insure that the optical fiber signal passed through the first optical fiber connector is passed into the second optical fiber connector.

The stepped alignment sleeve 128 is provided with an annular flange 154 formed about its exterior surface and intermediate the ends thereof. The diameter of the annular flange 154 equals the diameter of the flanges 134 and 144 of the alignment sleeve holders 18 and 108, respectively, for ease of interchangeability when being received within a respective one of the "hybrid" one-piece optical fiber adapters illustrated in FIGS. 17 and 18, as well as in FIGS. 10A through 10C. The stepped alignment sleeve is provided with an internal shoulder 155 for abutting the end of the 2.5 millimeter diameter ferrule, and a necked portion being defined within the first end 151 for securing the end of the 1.25 millimeter diameter ferrule within the tubular body.

Each of the one-piece optical fiber adapters of this invention, as illustrated in FIGS. 1 through 18, as well as the alignment sleeve holders 18 and 108, and stepped alignment sleeve 128, will preferably be constructed of a resilient plastic material, which plastic material may include polysulfone, and/or polyetherimide ("PEI"), as well as any other suitable materials.

FIGS. 17 and 18 illustrate a "family" of one-piece optical fiber adapters provided by this invention, for permitting both straight and hybrid optical fiber connections, when and as needed in the field. As seen from FIGS. 17 and 18, each of the respective bodies of the optical fiber adapters are similarly sized and shaped with respect to the mounting and locking flanges thereof, and each is constructed for being received within an identically sized and shaped opening 73' (FIG. 7) of the mounting panel 73 (FIG. 7). Although the provision of this entire family of one-piece optical fiber adapters may result, initially, in larger adapter parts inventories, this invention will simplify the task of service and installation technicians in the field in that they will not be required to connect two separate halves of a build-out together to create an adapter or build-out. The one-piece construction of the optical fiber connector adapter of this invention results in a more rugged and durable design, and unlike the earlier one-piece adapters, this family of one-piece adapters makes provision for receiving an alignment sleeve holder within a snap fit in the body, the alignment sleeve holder securely holding the alignment sleeve along the longitudinal axis of the adapter in a snap fit so that the alignment sleeve, a rather small and delicate part of the optical fiber connection, need not be first pressed onto a ferrule of an optical fiber connector before being passed into the adapter body on the end of the ferrule, as well as providing for the use of a stepped alignment sleeve for attaining a one-piece hybrid connection.

Although several preferred embodiments of the invention have been disclosed in the foregoing specification, it is understood by those skilled in the art that many modifications and other embodiments of the invention will come to mind to which the invention pertains, having the benefit of the teaching presented in the foregoing description and the associated drawings. It is thus understood that the invention is not limited to the specific embodiments disclosed herein, and that many modifications and other embodiments of the invention are intended to be included within the scope of the appended claims. Moreover, although specific terms are employed herein, as well as in the claims, they are used in a generic and descriptive sense only, and not for the purposes of limiting the described invention, nor the claims which follow.

We claim:

1. An adapter for coupling a first optical fiber connector to a second optical fiber connector, said adapter comprising:
   an elongate tubular one piece body formed about a longitudinal axis, said body having a first end and a spaced second end;
   the first end of said body being sized and shaped to receive therein a first LC optical fiber connector, the second end of said body being sized and shaped to receive therein a second optical fiber connector selected from one of the group of optical fiber connectors consisting of an SC optical fiber connector, an ST® optical fiber connector, and an FC optical fiber connector; and
   an elongate tubular alignment sleeve positioned along the longitudinal axis of said body and received therein in a snap fit;
   said alignment sleeve having an elongate tubular stepped body with a first end sized and shaped to receive the first optical fiber connector therein, a spaced second end sized and shaped to receive the second optical fiber connector therein, and an annular flange formed about the exterior of said stepped body intermediate the ends thereof.

2. The adapter of claim 1, wherein said alignment sleeve is releaseably held within said tubular body in said snap fit.

3. The adapter of claim 1, further comprising at least one latch gate constructed and arranged to deformably yield to the alignment sleeve as it is passed thereover and along said axis while being positioned within the tubular body, and to resiliently expand thereafter for retaining the alignment sleeve within the tubular body against at least one annular stop formed within said body and about said axis, said stop being spaced from said at least one latch gate, said annular flange being sized and shaped to deform the at least one latch gate as the alignment sleeve is passed along the longitudinal axis of the tubular body of the adapter and into said snap fit.

4. The adapter of claim 1, further comprising an attenuator element positioned within said alignment sleeve.

5. The adapter of claim 1, further comprising an alignment sleeve latching device for retaining the alignment sleeve within said body in said snap fit.

6. The adapter of claim 5, said alignment sleeve latching device comprising at least one elongate latch gate spaced from and extending in a lengthwise direction parallel to the axis of said body, and at least one annular stop formed within said body and about said axis, said stop being spaced from said at least one latch gate for defining a stepped alignment sleeve capture gap therebetween.

7. The adapter of claim 6, said at least one latch gate being constructed and arranged to deformably yield to the stepped alignment sleeve as it is passed thereover and along said axis while being positioned within the tubular body, and to resiliently expand thereafter for retaining the stepped alignment sleeve within the tubular body against said at least one annular stop in said first snap fit.

8. The adapter of claim 6, said alignment sleeve latching device further comprising a pair of said latch gates radially spaced from one another about said axis, and a corresponding pair of said annular stops spaced radially about said axis.

9. The adapter of claim 1, wherein said adapter is constructed and arranged to be received within a second snap fit in an adapter mounting panel.

10. The adapter of claim 9, comprising an annular mounting flange on the exterior surface of said body intermediate the ends thereof, and at least one resilient locking flange on the exterior surface of said body spaced from said mounting flange for defining a mounting panel capture gap therebetween, said locking flange being constructed and arranged to be resiliently urged inwardly toward said tubular body as the adapter is passed through a mounting panel opening defined within the mounting panel for receiving the adapter therein.

11. An adapter for coupling a first optical fiber connector to a second optical fiber connector, said adapter comprising:
   an elongate tubular one piece body formed about a longitudinal axis, said body having a first end and a spaced second end;
   the first end of said tubular body being sized and shaped to receive an LC optical fiber connector therein, the second end of said tubular body being sized and shaped to receive an optical fiber connector therein selected from one of the group of optical fiber connectors consisting of an LC optical fiber connector, an SC optical fiber connector, an ST® optical fiber connector, and an FC optical fiber connector;

an elongate tubular stepped alignment sleeve having a first end, a spaced second end, and an annular flange formed about the exterior of the alignment sleeve intermediate the ends thereof, said sleeve being positioned along the longitudinal axis of the tubular body and received therein in a snap fit; and an alignment sleeve latching device for retaining the alignment sleeve within said body in said snap fit.

12. The adapter of claim 11, said alignment sleeve latching device comprising at least one elongate latch gate spaced from and extending in a lengthwise direction parallel to the axis of said body, and at least one annular stop formed within said body and about said axis, said stop being spaced from said at least one latch gate for defining an alignment sleeve capture gap therebetween;

wherein said at least one latch gate is constructed and arranged to deformably yield to the flange of the stepped alignment sleeve as the alignment sleeve is passed thereover and along said axis while being positioned within the tubular body, and to resiliently expand thereafter for retaining the flange of the alignment sleeve within the capture gap against said at least one annular stop in said snap fit.

13. The adapter of claim 11, wherein said stepped alignment sleeve is releaseably held within the tubular body of the adapter in said snap fit.

14. An adapter for coupling a first optical fiber connector to a second optical fiber connector, said adapter comprising:

an elongate tubular one piece body formed about a longitudinal axis, said body having a first end and a spaced second end;

the first end of said body being sized and shaped to receive therein a first LC optical fiber connector, the second end of said body being sized and shaped to receive therein a second optical fiber connector selected from one of the group of optical fiber connectors consisting of an SC optical fiber connector, an ST® optical fiber connector, and an FC optical fiber connector; and an elongate tubular alignment sleeve positioned along the longitudinal axis of said body and received therein in a snap fit;

said alignment sleeve having an elongate tubular stepped body with a first end sized and shaped to receive the first optical fiber connector therein, and a spaced second end sized and shaped to receive the second optical fiber connector therein.

15. An adapter for coupling a first optical fiber connector to a second optical fiber connector, said adapter comprising:

an elongate tubular one piece body formed about a longitudinal axis, said body having a first end and a spaced second end;

the first end of said body being sized and shaped to receive therein a first optical fiber connector having a ferrule diameter of 1.25 mm, the second end of said body being sized and shaped to receive therein a second optical fiber connector having a ferrule diameter of 2.5 mm; and an elongate tubular alignment sleeve positioned along the longitudinal axis of said body and received therein in a snap fit;

said alignment sleeve having an elongate tubular stepped body with a first end sized and shaped to receive the first optical fiber connector therein, and a spaced second end sized and shaped to receive the second optical fiber connector therein.

* * * * *